(12) United States Patent
Kiyoki

(10) Patent No.: US 11,907,297 B2
(45) Date of Patent: Feb. 20, 2024

(54) INTEGRATED SEARCH SYSTEM

(71) Applicant: Yasushi Kiyoki, Tsukuba (JP)

(72) Inventor: Yasushi Kiyoki, Tsukuba (JP)

(73) Assignee: Yasushi Kiyoki, Tsukuba (JP)

( * ) Notice: Subject to any disclaimer, the term of this patent is extended or adjusted under 35 U.S.C. 154(b) by 0 days.

(21) Appl. No.: 17/794,170

(22) PCT Filed: Jan. 7, 2021

(86) PCT No.: PCT/JP2021/000415
§ 371 (c)(1),
(2) Date: Jul. 20, 2022

(87) PCT Pub. No.: WO2021/149505
PCT Pub. Date: Jul. 29, 2021

(65) Prior Publication Data
US 2023/0052508 A1 Feb. 16, 2023

(30) Foreign Application Priority Data
Jan. 22, 2020 (JP) .................................. 2020-008579

(51) Int. Cl.
*G06F 17/00* (2019.01)
*G06F 7/00* (2006.01)
(Continued)

(52) U.S. Cl.
CPC ...... *G06F 16/9032* (2019.01); *G06F 16/9038* (2019.01); *G06F 18/10* (2023.01)

(58) Field of Classification Search
CPC ... G06F 16/9032; G06F 16/9038; G06F 18/10
(Continued)

(56) References Cited

U.S. PATENT DOCUMENTS 6,269,365 B1 7/2001 Kiyoki et al.
6,727,927 B1* 4/2004 Dempski ............... G06F 16/338
715/810
(Continued)

FOREIGN PATENT DOCUMENTS

JP  10-49409 A   2/1998
JP  11-306351 A  11/1999
(Continued)

OTHER PUBLICATIONS

International Search Report dated Mar. 23, 2021, issued in counterpart International Application No. PCT/JP2021/000415. (2 pages).

*Primary Examiner* — Pavan Mamillapalli
(74) *Attorney, Agent, or Firm* — WHDA, LLP

(57) ABSTRACT

An upper-level integrated processing device recognizes an inquiry, generates a search request in a primitive form to be output to each of the individual AI search devices in response to the inquiry, receives an individual reply and the probability thereof corresponding to the search request in the primitive form from a plurality of individual AI search devices, normalizes the probabilities of the individual replies from the individual AI search devices to acquire normalized probabilities, and generates an inquiry reply corresponding to the individual replies and the normalized probabilities thereof, and the lower-level individual AI search device searches Individual AI database using artificial intelligence in response to reception of the search request in the primitive form, acquires an individual reply and the probability thereof, and outputs the same in the primitive form to the integrated processing device. The upper-level devices output reply using a plurality of AI search devices in combination.

12 Claims, 10 Drawing Sheets

(51) Int. Cl.
  *G06F 16/9032* (2019.01)
  *G06F 16/9038* (2019.01)
  *G06F 18/10* (2023.01)

(58) Field of Classification Search
  USPC .......................................................... 707/769
  See application file for complete search history.

(56) References Cited

U.S. PATENT DOCUMENTS

2007/0136264 A1* 6/2007 Tran .................... G06F 16/9535
  707/E17.109
2010/0312782 A1* 12/2010 Li ........................ G06F 16/9038
  707/753
2014/0358910 A1* 12/2014 Frigon ................ G06F 16/9038
  707/723

FOREIGN PATENT DOCUMENTS

| JP | 2014-21602 A | 2/2014 |
| JP | 2018-33050 A | 3/2018 |
| JP | 2019-185388 A | 10/2019 |

* cited by examiner

Fig. 6

Examples of search requests in primitive forms (R-1)-(R-4)

(R-1)　Function　name　: AI-face-image-recognition-primitive-1(face-image-1　for search, face-photo-DB1 of the individual AI search device ID-1, Search condition: face-similarity)
→ (Required reply result : Personal ID including the person's name of a person whose face is similar to the face image and its probability)

(R-1)AI-face-image-recognition-primitive-1(face-image-1,　face-photo-DB1,　face-similarity)
→ (Result-value: Personal-ID-probability)

(R-2)　Function　name　: AI-face-image-recognition-primitive-2(face-image-1　for search, face-photo-DB2 of the individual AI search device ID-2, Search condition: face-similarity)
→ (Required reply result : Personal ID including the person's name of a person whose face is similar to the face image and its probability)

(R-2)AI-face-image-recognition-primitive-2(face-image-1,　face-photo-DB2,　face-similarity)
→ (Result-value: Personal-ID-probability)

(R-3)　Function　name　: AI-fingerprint-image-recognition-primitive-1(fingarprint-image-1 for search, fingerprint-photo-DB3 of the individual AI search device ID-3, Search condition: fingerprint-similarity)
→ (Required reply result : Personal ID including the person's name of a person whose fingerprint is similar to the fingerprint image and its probability)

(R-3)AI-fingerprint-image-recognition-primitive-1(fingerprint-image-1, fingerprint-photo-DB3, fingerprint-similarity)
→ (Result-value: Personal-ID-probability)

(R-4)　Function　name　: Non-AI-personal-position-time-recognition-primitive-1 (Personal-ID-1, Non-AI-personal-position-time-DB4 of the individual non-AI search device ID-4, Search condition: Personal-ID)
→ (Required reply result : Position information at current time of the person identified by Personal-ID-1)

(R-4)Non-AI-personal-position-time-recognition-primitive-1(Personal-ID-1,　Non-AI-personal-position-time-DB4, Personal-ID)
→ (Result-value: Personal-ID-1, position (latitude, longitude), current-time)

Fig. 7

Examples of individual replies in primitive forms (AI-A-1)-(AI-A-3)

(AI-A-1) Function name : Face-image-recognition-result-primitive-1 (Personal-ID, Probability)
→ (Output result : integration-form · (Personal-ID, Probability))

(AI-A-1)Face-image-recognition-result-primitive-1(Personal-ID-probability)
→ (integration-form-(Personal-ID-probability))

(AI-A-2) Function name : Face-image-recognition-result-primitive-2 (Personal-ID, Probability)
→ (Output result : integration-form · (Personal-ID, Probability))

(AI-A-2)Face-image-recognition-result-primitive-2(Personal-ID-probability)
→ (integration-form-(Personal-ID-probability))

(AI-A-3) Function name : Fingerprint-image-recognition-result-primitive-1 (Personal-ID, Probability)
→ (Output result : integration-form · (Personal-ID, Probability))

(AI-A-3)Fingerprint-recognition-result-primitive-1(Personal-ID-probability)
→ (integration-form-(Personal-ID-probability))

Fig. 8

An example of non-AI individual reply in a primitive form (NAI-A-1)

(NAI-A-1) Function name : Personal-position-time-result-primitive-1(Personal-ID-1, position, current-time)
→ (Output result : integration-form · (Personal-ID, position, current-time))

(NAI-A-1)Personal-position-time-result-primitive-1(Personal-ID-1, position(latitude, longitude), current-time)
→ (integration-form-(Personal-ID, position(latitude, longitude), current-time))

FIG. 9 (a)   Another example of individual reply in a primitive form (AI-A-01)

(AI-A-01)  Function name : Face-image-recognition-result-primitive-1
    ((Personal-ID, Probability)  List A001)
    → (Output result : integration-form・(Personal-ID, Probability)・List A001)

(AI-A-01)Face-image-recognition-result-primitive-1((Personal-ID-probability   )
    list-A001)
    → (integration-form-(Personal-ID-probability)-list-A001)

FIG. 9 (b)   Another example of non-AI individual reply in a primitive form (NAI-A-01)

(NAI-A-1) Function name : Personal-position-time-result-primitive-1((Personal-ID-
    1, position, current-time)  List A001)
    → (Output result : integration-form・(Personal-ID, position, current-time)・List
    A001)

(NAI-A-01)Personal-position-time-result-primitive-1(Personal-ID,           position
    (latitude, longitude), current-time)-listA001)
    →(integration-form-(Personal-ID, position(latitude, longitude), current-time)-
    listA001)

FIG. 10(a)  An example of an integrated reply in a primitive form (Integration-primitive-A-1)

> (Integration-primitive-A-1) Function name : AI integrated-personal-recognition-position-time-result-primitive-1(Personal-ID, global-probability, position, current-time)
> → (Output result : integration-form · (Personal-ID, global-probability, position, current-time)
>
> (Integration-primitive-A-1) Integrated-personal-recognition-position-time-result-primitive-1 (Personal-ID, global-probability, position(latitude, longitude), current-time)
> → (integration-form-(Personal-ID-probability-position-time))

FIG. 10(b)  Another example of an integrated reply in a primitive form (Integration-primitive-A-01)

> (Integration-primitive-A-01) Function name : AI integrated-personal-recognition-position-time-result-primitive-1((Personal-ID, global-probability, position, current-time) List I001)
> → (Output result : integration-form · ((Personal-ID, global-probability, position, current-time) · List I001)
>
> (Integration-primitive-A-01) Integrated-personal-recognition-position-time-result-primitive-1 ((Personal-ID, global-probability, position(latitude, longitude), current-time) list-I001)
> → (integration-form-(Personal-ID-probability-position-time)-list-I001))

INTEGRATED SEARCH SYSTEM

TECHNICAL FIELD

The present invention relates to an integrated search system in which a lower-level device executes a search process using a database in response to a request from an upper-level device, and the upper-level device outputs a reply to an inquiry.

BACKGROUND ART

Conventionally, a heterogeneous database integration system of Patent Literature 1 is known as a system in which a lower-level device executes a search process using a database in response to a request from an upper-level device and the upper-level device outputs a reply to an inquiry. In the system of Patent Literature 1, a data processing system capable of referring to a plurality of types of databases is composed of an upper-level device and a lower-level device, in which the upper-level device receives an inquiry in a script form including a plurality of inquiry items, a reply condition that replies to the plurality of inquiry items should satisfy, a combining condition for combining a plurality of different reply items for the plurality of inquiry items based on a relationship that different values of each item should satisfy, analyzes inquiries to issue a group of pieces of control information in a primitive form, receives replies from a plurality of types of databases in a primitive form for the inquiries from the lower level device and combines the replies based on the combining condition, transforms the combined reply into a script form and outputs the transformed reply, and the lower-level device transforms the issued control information in the primitive form into a control command corresponding to the corresponding type, outputs the transformed control command to the database of the corresponding type, and outputs the processing results in the primitive form to the upper-level device.

CITATION LIST

Patent Literature

[PTL 1] Japanese Patent No. 4533974

SUMMARY OF INVENTION

Technical Problem

In the system of Patent Literature 1, the upper-level device can output a reply based on a limited amount of data to an inquiry using a combination of a plurality of databases having a uniform and limited amount of data, however, it is not possible for the upper-level device to output a reply with a high probability based on a large amount of data using a combination of a plurality of AI search devices trained with a large amount of data. Therefore, there is a demand for a system in which an upper-level device can output a reply with a high probability based on a large amount of data using a plurality of AI search devices trained with a large amount of data. Further, at that time, in order for the upper-level device to output a more appropriate reply, it is desirable that the upper-level device evaluates the probabilities of individual replies from each AI search device on the same scale.

The present invention has been proposed in view of the above problems, and an object thereof is to provide an integrated search system which enables a plurality of AI search devices trained with a large amount of data to be used in combination and in which an upper-level device can output a reply with a high probability based on a large amount of data and the upper-level device can evaluate the probabilities of individual replies from each AI search device on the same scale.

Solution to Problem

An integrated search system of the present invention includes: an upper-level integrated processing device; and a plurality of lower-level individual AI search devices, wherein the integrated processing device includes: an inquiry recognition unit that recognizes an inquiry; a search request generation unit that generates a search request in a primitive form to be output to each of the individual AI search devices in response to the inquiry; a normalization processing unit that receives an individual reply corresponding to the search request in the primitive form and a probability of the individual reply from each of the plurality of individual AI search devices and acquires a normalized probability obtained by normalizing the probability of the individual reply of each of the individual AI search devices on the same scale; and an inquiry reply generation unit that generates an inquiry reply corresponding to each of the individual replies and the normalized probability thereof, and the individual AI search device includes: an individual AI database; a search processing unit that searches the individual AI database using artificial intelligence in response to reception of the search request in the primitive form, acquires an individual reply corresponding to the search request in the primitive form from the individual AI database, and acquires the probability of the individual reply; and an individual reply output unit that outputs the acquired individual reply and the probability of the individual reply in the primitive form to the integrated processing device.

According to this, a plurality of individual AI search devices trained with a large amount of data can be used in combination, and the integrated processing device which is an upper-level device can generate an inquiry reply with a high probability based on a large amount of data, and can output an inquiry reply with a high probability. In addition, since the integrated processing device which is the upper-level device acquires the normalized probability obtained by normalizing the probability of the individual reply of the individual AI search device on the same scale, the upper-level integrated processing device can evaluate the probabilities of the individual replies of the individual AI search devices on the same scale. Further, since the upper-level integrated processing device generates and outputs the inquiry reply corresponding to the normalized probability, it is possible to output a more accurate reply.

In the integrated search system of the present invention, one individual AI database searched by at least one individual AI search device among the individual AI databases of the plurality of individual AI search devices and one individual AI database searched by another individual AI search device may be different types of databases.

According to this, it is possible to generate an inquiry reply based on a multifaceted evaluation or viewpoint using different types of individual AI databases and output a more accurate reply. In addition, it is possible to generate an inquiry reply that fits a more complex inquiry.

In the integrated search system of the present invention, one individual AI database searched by at least one individual AI search device among the individual AI databases of the plurality of individual AI search devices and one individual AI database searched by another individual AI search device may be same types of databases.

According to this, it is possible to generate an inquiry reply based on an in-depth evaluation or viewpoint using the same types of individual AI databases, and output a more accurate reply. In addition, since an inquiry reply is generated based on evaluations using a plurality of same types of individual AI databases, even when inaccurate data is set in a specific individual AI database due to a human error or the like or a large amount of over-learning data corresponding to an event with a low occurrence frequency is set, it is possible to suppress the deterioration of accuracy that occurs in the inquiry reply caused by these pieces of data.

In the integrated search system of the present invention, each of the search processing units of the plurality of individual AI search devices may search the individual AI database using deep learning artificial intelligence, and acquire an output value of an output layer indicating prediction accuracy of the individual reply as the probability of the individual reply.

According to this, the individual AI search device which is the lower-level device can obtain an individual reply with an extremely high probability and prediction accuracy based on the search process using deep learning, and based on this, the integrated processing device which is the upper-level device can generate and output an inquiry reply with an extremely high probability and prediction accuracy.

The integrated search system of the present invention may further include: an individual non-AI search device in the lower level, the search request generation unit of the integrated processing device may generate a search request in a primitive form to be output to the individual non-AI search device in response to the inquiry, the inquiry reply generation unit of the integrated processing device may generate an inquiry reply corresponding to the individual reply and the normalized probability thereof and corresponding to a non-AI individual reply, and the individual non-AI search device may include: an individual non-AI database; a search processing unit that searches the individual non-AI database in response to reception of the search request in the primitive form and acquires a non-AI individual reply corresponding to the search request in the primitive form from the individual non-AI database; and an individual reply output unit that outputs the acquired non-AI individual reply in the primitive form to the integrated processing device.

According to this, it is possible to generate inquiry replies based on various evaluations and viewpoints using a plurality of individual AI databases and individual non-AI databases and output a more accurate reply. Moreover, it is possible to integrate individual replies from the individual non-AI database in addition to the individual replies of the individual AI search devices and generate and output a multifaceted inquiry reply suitable for a more complex inquiry.

In the integrated search system of the present invention, the search request generation unit of the integrated processing device may extract feature points corresponding to a type of the individual AI database or the type of the individual AI database and a type of the individual non-AI database from the inquiry data using artificial intelligence and generate a search request in the primitive form corresponding to the feature points.

According to this, it is possible to generate a search request in a more suitable primitive form more suitable for the inquiry data, such as the content of the inquiry, and generate an inquiry reply based on the individual reply corresponding to the more suitable search request in the primitive form. Therefore, it is possible to further improve the accuracy of the inquiry reply and to provide a more accurate reply. In addition, it is possible to generate an accurate search request that exceeds the expectations of the search user by using the reply of the feature point extraction by the processing of artificial intelligence for the search request of the secondary inquiry, and to enhance the accuracy of the secondary inquiry itself.

In the integrated search system of the present invention, input data from a sensor that detects a necessary physical quantity may be included in the inquiry data.

According to this, it is possible to generate an inquiry reply suitable for the detection status of the sensor and output the reply based on an inquiry corresponding to the detection status of the sensor such as the state of the climate, the physical condition of the search user, and the state of the physical quantity related to the search target, for example.

Advantageous Effects of Invention

According to the integrated search system of the present invention, a plurality of AI search devices trained with a large amount of data can be used in combination, the upper-level device can output a reply with a high probability based on a large amount of data and can evaluate the probabilities of individual replies from each AI search device on the same scale.

BRIEF DESCRIPTION OF DRAWINGS

FIG. 6 is an explanatory diagram illustrating an example of a search request in primitive form.

FIG. 7 is an explanatory diagram illustrating an example of an individual reply in a primitive form.

FIG. 8 is an explanatory diagram illustrating an example of a non-AI individual reply in primitive form.

FIG. 9($a$) is an explanatory diagram illustrating another example of an individual reply in a primitive form, and FIG. 9($b$) is an explanatory diagram illustrating another example of a non-AI individual reply in a primitive form.

FIG. 10($a$) is an explanatory diagram illustrating an example of an integrated reply in a primitive form, and FIG. 10($b$) is an explanatory diagram illustrating another example of an integrated reply in a primitive form.

DESCRIPTION OF EMBODIMENTS

[Integrated Search System of Embodiment]

Figure 1:
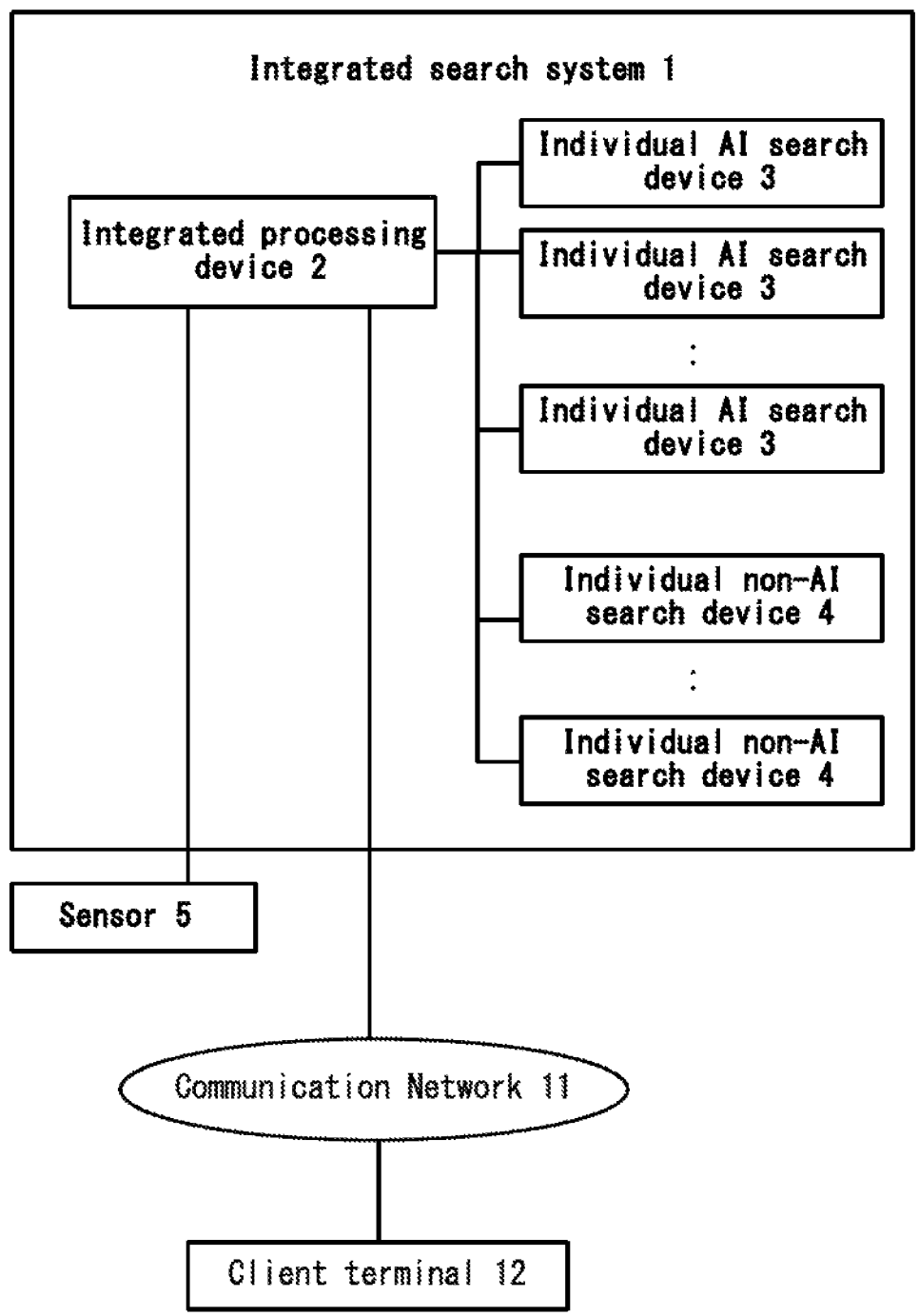
FIG. 1 is a block diagram showing an overall configuration of an integrated search system according to an embodiment of the present invention.

As shown in FIG. 1, an integrated search system 1 according to the present invention includes an upper-level integrated processing device 2, a plurality of lower-level individual AI search devices 3, and a lower-level individual non-AI search device 4. In response to the request of the upper-level integrated processing device 2 in the upper level, the lower-level individual AI search device 3, or the lower-level individual AI search device 3 and the lower-level individual non-AI search device 4 execute(s) a search process using a database, and the upper-level integrated processing device 2 outputs a reply to the inquiry based on the individual reply from the lower level. The lower-level individual non-AI search device 4 may be singular or plural as needed. The integrated search system may be configured such that only a plurality of individual AI search devices 3 is provided in the lower level, and the individual non-AI search device 4 is not provided in the lower level.

Figure 2:
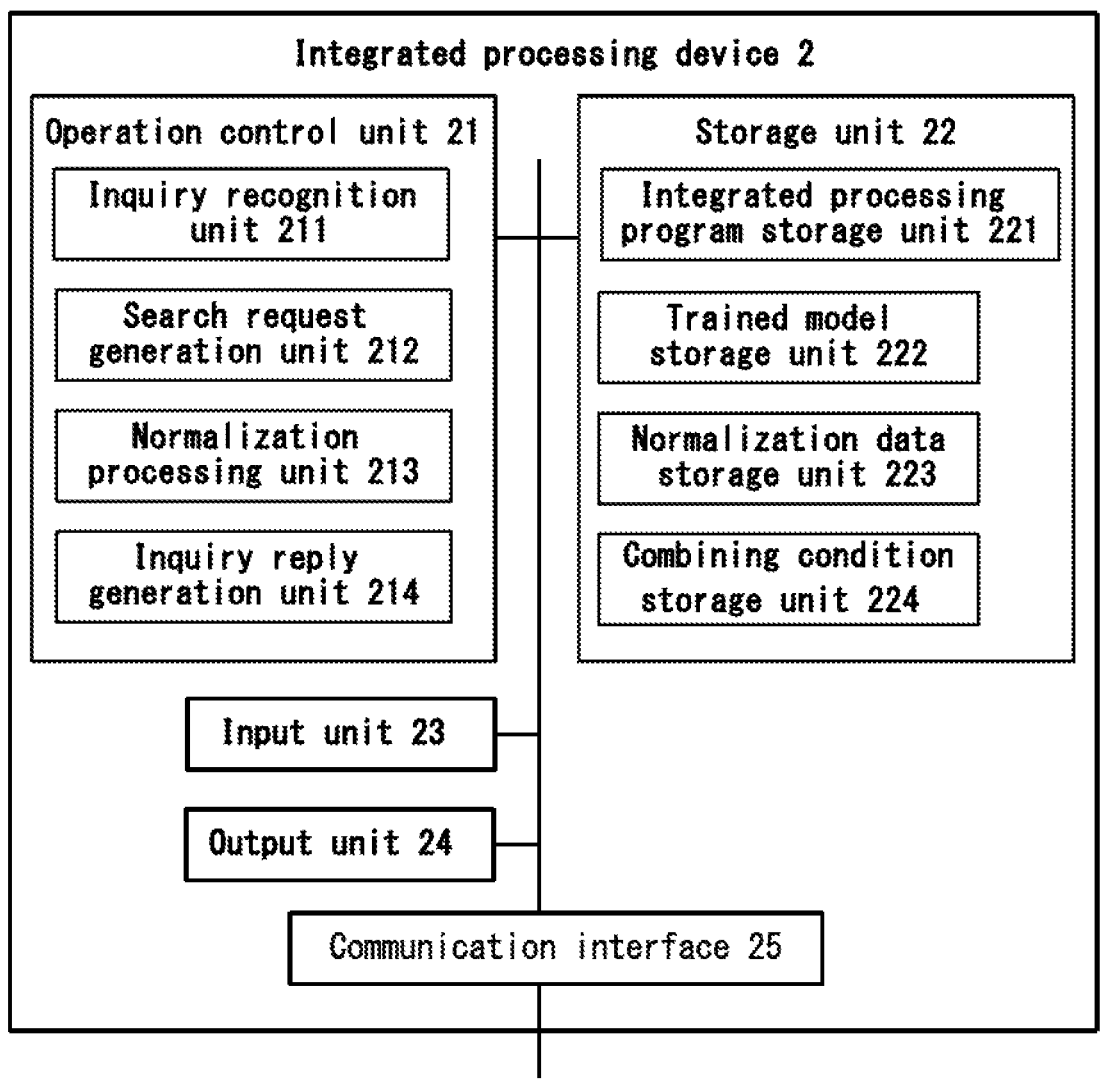
FIG. 2 is a block diagram showing a configuration of an integrated processing device in the integrated search system of the embodiment.

As shown in FIG. 2, the upper-level integrated processing device 2 includes an operation control unit 21 such as an MPU and a CPU, a storage unit 22 composed of an HDD, a flash memory, an EEPROM, a ROM, a RAM, and the like, an input unit 23 such as a mouse, a keyboard, and a touch panel, an output unit 24 such as a display, and a communication interface 25, and is realized by a computer device such as a server.

The storage unit 22 stores a control program such as an integrated processing program that causes the operation control unit 21 to execute predetermined processing, and has an integrated processing program storage unit 221 that stores the integrated processing program. Within the integrated processing program, a search request generation program that causes the operation control unit 21 to execute a search request generation process of generating a search request in a primitive form that is output in response to the inquiry is an artificial intelligence program. The search request generation program causes the operation control unit 21 to execute the search request generation process using a trained model stored in a trained model storage unit 222 of the storage unit 22. It is preferable to use a deep learning artificial intelligence program as the artificial intelligence program of the search request generation program.

The type of data corresponding to the type of an Individual AI database 323 of each individual AI search device 3 and the type of data corresponding to the type of an individual non-AI database 422 of the individual non-AI search device 4 are set for the trained model and are stored in the trained model storage unit 222. When an integrated search system is configured such that the individual non-AI search device 4 is not provided in the lower level, the type of data corresponding to the type of the Individual AI database of each individual AI search device 3 is set for the trained model and is stored in the trained model storage unit 222.

The storage unit 22 has a normalization data storage unit 223 that stores normalization data for normalizing the probability of each individual AI search device 3, corresponding to specified data that defines the probability of the individual reply from each individual AI search device 3.

The storage unit 23 has a combining condition storage unit 224 that stores a combining condition for the inquiry reply generation unit 214 to generate the normalized probability and an inquiry reply corresponding to a non-AI individual reply from the individual non-AI search device 4. As the combination condition, for example, "equivalence of personal ID", "recording", "acquisition of average normalized probability from normalized probability" corresponding to individual replies from the individual AI search devices 3, and the like are set.

The operation control unit 21 executes predetermined processing according to the integrated processing program, and executes predetermined processing as an inquiry recognition unit 211, a search request generation unit 212, a normalization processing unit 213, and an inquiry reply generation unit 214 in cooperation with the integrated processing program.

The inquiry recognition unit 211 recognizes the inquiry or inquiry data input to the integrated processing device 2. In the present embodiment, a client terminal 12 is connected to the integrated processing device 2 via the communication network 11 by a communication line, a basic inquiry transmitted from the client terminal 12 is input to the integrated processing device 2, and data is input from one or a plurality of sensors 5 electrically connected to the integrated processing device 2. The input data from the sensor 5 that detects the necessary physical quantity is input to the integrated processing device 2 as an auxiliary inquiry. Then, for example, the integrated processing device 2 or the inquiry recognition unit 211 acquires the detection data from the sensor 5 as an auxiliary inquiry in response to the input of the basic inquiry, and combines the basic inquiry data and the auxiliary inquiry data to recognize inquiry data.

Further, for example, the integrated processing device 2 or the inquiry recognition unit 211 may preferably be configured to recognize the basic inquiry transmitted from the client terminal 12 as an inquiry or inquiry data in response to the input of information indicating that the sensor detection data is not to be used transmitted from the client terminal 12 or input by the integrated processing device 2. The sensor 5 itself may not be connected to the integrated processing device 2, and instead, the integrated processing device 2 or the inquiry recognition unit 211 may recognize the basic inquiry transmitted from the client terminal 12 as an inquiry or inquiry data. Further, the integrated processing device 2 may be configured such that the sensor detection data is included in the inquiry itself transmitted or input from the client terminal 12 or the like, and the inquiry recognition unit 211 recognizes an inquiry which is a combination of a basic inquiry and an auxiliary inquiry including the sensor detection data. Further, the inquiry recognition unit 211 of the integrated processing device 2 may preferably recognize the input data itself from the sensor 5 that detects a necessary physical quantity as an inquiry or inquiry data rather than an auxiliary inquiry.

The search request generation unit 212 generates a search request in a primitive form to be output to each of the individual AI search devices 3 and generates a search request in a primitive form to be output the search request to the individual non-AI search device 4, in response to the inquiry recognized by the inquiry recognition unit 211. In the case of an integrated search system in which only a plurality of individual AI search devices 3 are provided in the lower level and no individual non-AI search device 4 is provided in the lower level, only the search request in the primitive form to be output to each of the individual AI search devices 3 is generated by the search request generation unit 212, in response to the inquiry recognized by the inquiry recognition unit 211.

The search request generation unit 212 in the present embodiment extracts a feature point corresponding to the type of the Individual AI database of each individual AI search device 3 and a feature point corresponding to the type of the individual non-AI database of the individual non-AI search device 4 as necessary by using artificial intelligence from the inquiry data, in other words, by the processing of the operation control unit 21 that cooperates with the search request generation program of the artificial intelligence program and generates search requests in a primitive form corresponding to the feature points. When the integrated search system is configured such that the individual non-AI search device 4 is not provided in the lower level, the search request generation unit 212 extracts the feature points corresponding to the type of the individual AI database of each individual AI search device 3 as necessary and generates search requests in a primitive form corresponding to the feature points.

Here, the primitive form of the search request in a primitive form is a function call form for calling a function composed of one or a plurality of types of functions including a function interpreted and executed by the operation control unit 21 of the integrated processing device 2, a function interpreted and executed by the operation control unit 31 of the individual AI search device 3 described later, and a function interpreted and executed by the operation control unit 41 of the individual non-AI search device 4 described later. Concatenation of multiple function descriptions in the primitive form makes it possible to execute calculations that concatenate multiple functions.

For example, the search request generation unit 212 of the integrated processing device 2 issues a search request in a function call form, which is a primitive form, to the lower-level individual AI search device 3 and the lower-level individual non-AI search device 4, which will be described later. The search processing unit 311 of the individual AI search device 3 and the search processing unit 411 of the individual non-AI search device 4 execute the processing corresponding to the search request. The individual reply output unit 312 of the individual AI search device 3 and the individual reply output unit 412 of the individual non-AI search device 4 outputs a search result of the interpretation execution result (data including the individual reply and the probability or data including a non-AI individual reply) in a function call form which is a primitive form of a common data form. The operation control unit 21 of the integrated processing device 2 executes a process of receiving the output data which is the search result and passes the output data to a subsequent function defined by the combining condition as an argument.

The normalization processing unit 213 receives an individual reply corresponding to the search request in the primitive form from each of the plurality of individual AI search devices 3 and the probability of the individual reply and acquires a normalized probability obtained by normalizing the probability of the individual reply of each individual AI search device 3 on the same scale using the normalization data corresponding to the specified data that defines the probability of the individual reply of each individual AI search device 3 of the normalization data storage unit 223.

Here, the normalization data corresponding to the specified data that defines the probability of the individual reply of each individual AI search device 3 stored in the normalization data storage unit 223 is, for example, the maximum value and the minimum value of a value that the probability as the individual reply output by each individual AI search device 3 can take. In this case, the normalization data is the maximum value of the probability and the minimum value of the probability for each individual AI search device 3. The normalization processing unit 213 executes a normalization process of, for example, ((probability of individual reply)−(minimum value of probability))/((maximum value of probability)−(minimum value of probability)) for each individual AI search device 3 that has received the individual reply to normalize the probability of the individual reply for each individual AI search device 3 between 0.0 and 1.0.

The inquiry reply generation unit 214 generates an inquiry reply corresponding to the individual reply and the normalized probability thereof from the individual AI search device 3 and the non-AI individual reply from the individual non-AI search device 4 using the combining condition corresponding to the inquiry stored in the storage unit 22. When the integrated search system is configured such that the individual non-AI search device 4 is not provided in the lower level, the inquiry reply generation unit 214 generates an inquiry reply corresponding to the individual reply from the individual AI search device 3 and the normalized probability thereof using the combining condition corresponding to the inquiry stored in the storage unit 22.

Figure 3:
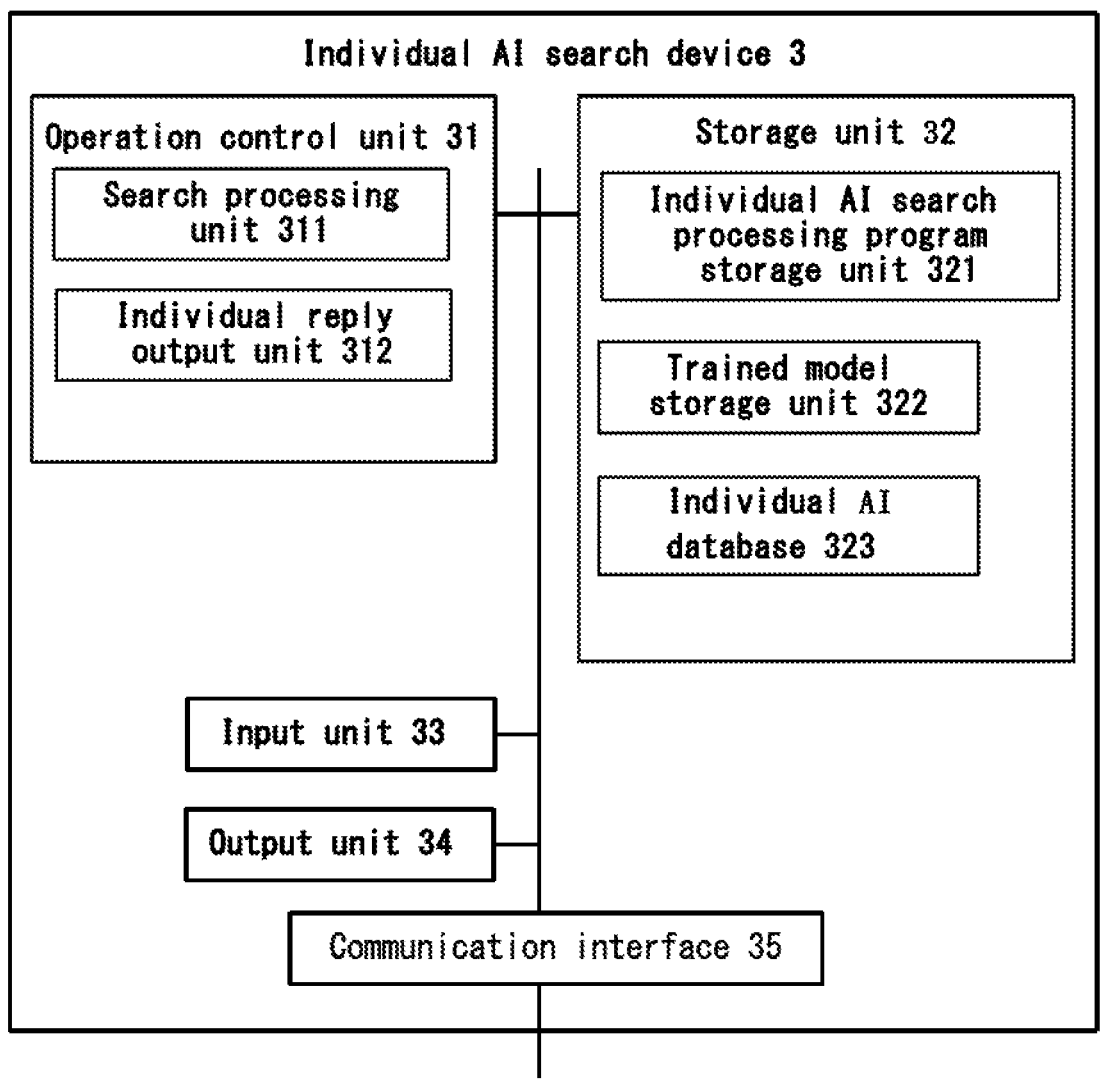
FIG. 3 is a block diagram showing a configuration of an individual AI search device in the integrated search system of the embodiment.

As shown in FIG. 3, each individual AI search device 3 constituting the plurality of lower-level individual AI search devices 3 includes an operation control unit 31, such as an MPU and a CPU, a storage unit 32 composed of an HDD, a flash memory, an EEPROM, a ROM, a RAM, and the like; an input unit 33 such as a mouse, a keyboard, and a touch panel, an output unit 34 such as a display, and a communication interface 35, and is realized by a computer device such as a server or a collection of a plurality of computer terminals connected by a communication connection network.

The storage unit 32 stores a control program such as an individual AI search processing program that causes the operation control unit 31 to execute predetermined processing, and has an individual AI search processing program storage unit 321 that stores the individual AI search processing program. The individual AI search processing program is an artificial intelligence program, and the individual AI search processing program causes the operation control unit 21 to execute an individual AI search process using the trained model stored in the trained model storage unit 322 of the storage unit 32. It is preferable to use a deep learning artificial intelligence program as the artificial intelligence program of the necessary individual AI search device 3 among the plurality of individual AI search devices 3. It is more preferable to use a deep learning artificial intelligence program as the individual AI search processing program of all the lower-level individual AI search devices 3. Further, the Individual AI database 323 that stores data searched by the individual AI search process is provided in the storage unit 32, and one or more individual databases 323 may be provided as necessary. Further, it is preferable that the individual database 323 is updated from time to time.

Among the individual AI databases 323 of the plurality of individual AI search devices 3, one individual database 323 searched by one individual AI search device 3 and one individual AI database 323 searched by another individual AI search device 3 are preferably different types of databases. That is, it is preferable to provide one individual AI search device 3 and another individual AI search device 3 that search different types of data. Further, among the individual AI databases 323 of the plurality of individual AI search devices 3, one individual AI database 323 searched by one individual AI search device 3 and one individual AI database 323 searched by another individual AI search device 3 may preferably be the same types of databases. That is, it may be preferable to provide one individual AI search device 3 and another individual AI search device 3 that search the same types of data. Further, when different types of individual AI databases 323 and the same types of individual AI databases 323 are mixed in the individual AI databases 323 of the plurality of individual AI search devices 3, it may be preferable that a plurality of individual AI search devices 3 that searches different types of data and a plurality of individual AI search devices 3 that searches the same types of data are provided.

The operation control unit 31 executes predetermined processing according to the individual AI search processing program, and executes predetermined processing as the search processing unit 311 and the individual reply output unit 312 in cooperation with the individual AI search processing program.

In response to reception of a search request in a primitive form from the integrated processing device 2, the search processing unit 311 searches the individual AI database 323 using artificial intelligence, that is, by the processing of the operation control unit 31 in cooperation with the individual AI search processing program of the artificial intelligence program, acquires an individual reply corresponding to the search request in the primitive form from the individual AI database 323, and acquires the probability of the acquired individual reply. When a deep learning artificial intelligence program is used as the individual AI search processing program, the search processing unit 311 searches the individual AI database 232 using deep learning artificial intelligence and acquires an output value of an output layer indicating the prediction accuracy of the individual reply as the probability of the individual reply.

The individual reply output unit 312 outputs the acquired individual reply and the probability of the individual reply in a primitive form to the integrated processing device 2.

Figure 4:
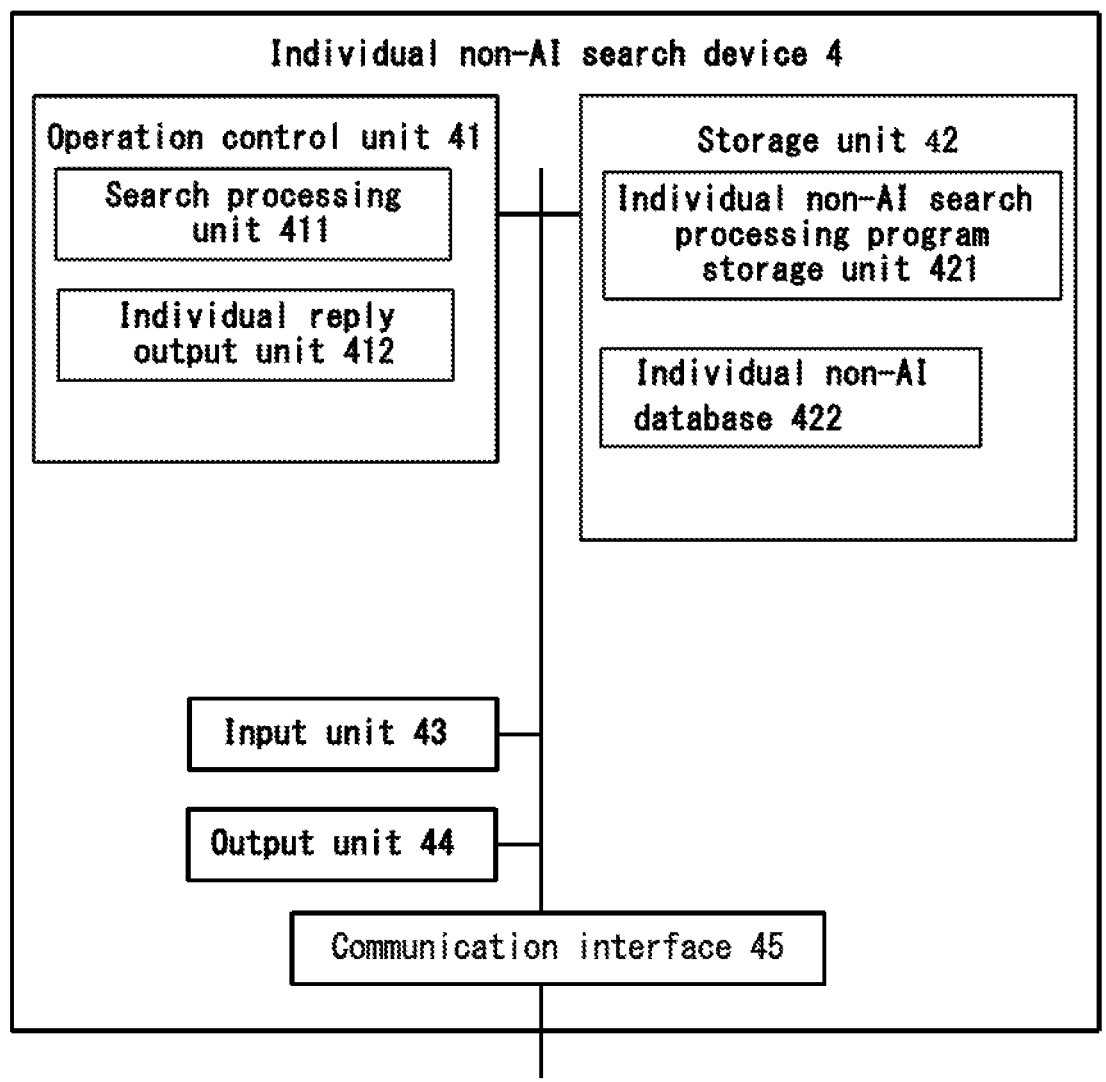
FIG. 4 is a block diagram showing a configuration of an individual non-AI search device in the integrated search system of the embodiment.

As shown in FIG. 4, the lower-level individual non-AI search device 4 includes an operation control unit 41 such as an MPU and a CPU, a storage unit 42 composed of an HDD, a flash memory, an EEPROM, a ROM, a RAM, and the like, an input unit 43 such as a mouse, a keyboard, and a touch panel, an output unit 44 such as a display, and a communication interface 45, and is realized by a computer device such as a server or a collection of a plurality of computer terminals connected by a communication connection network.

The storage unit 42 stores a control program such as an individual non-AI search processing program that causes the operation control unit 41 to execute predetermined processing and has an individual non-AI search processing program storage unit 421 that stores the individual non-AI search processing program. The individual non-AI search processing program is an individual search processing program which is not an artificial intelligence program and executes a search process, and causes the operation control unit 21 to execute an individual search process that does not use artificial intelligence. Further, the storage unit 42 is provided with an individual non-AI database 422 that stores data searched by an individual non-AI search process. Further, it is preferable that the individual database 422 is updated from time to time.

The operation control unit 41 executes predetermined processing according to the individual non-AI search processing program, and executes predetermined processing as the search processing unit 411 and the individual reply output unit 412 in cooperation with the individual non-AI search processing program.

The search processing unit 411 searches the individual non-AI database 422 in response to reception of a search request in a primitive form from the integrated processing device 2, and acquires a non-AI individual reply corresponding to the search request in a primitive form from the individual non-AI database 422.

The individual reply output unit 412 outputs the acquired non-AI individual reply in a primitive form to the integrated processing device 2.

Figure 5:
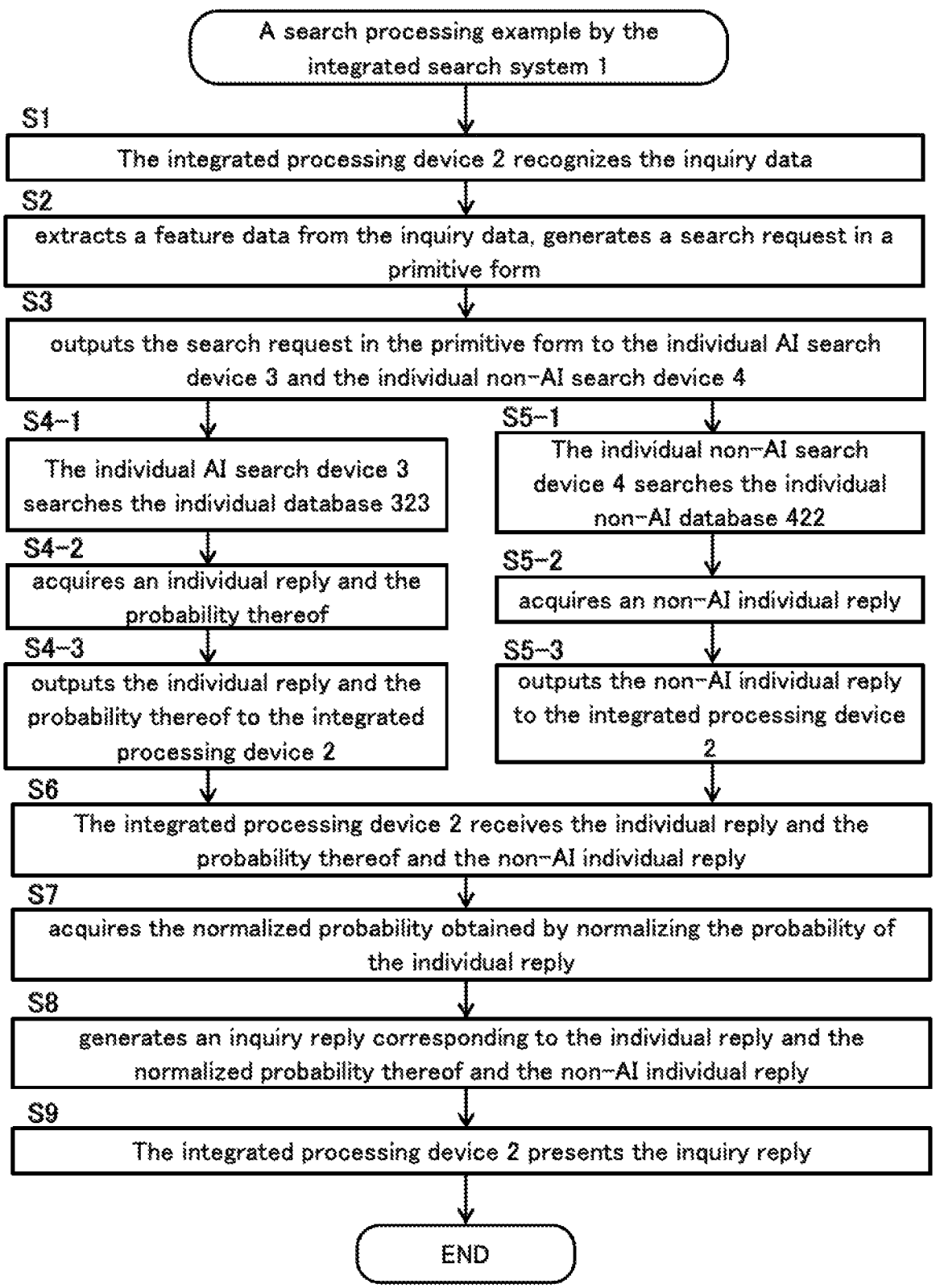
FIG. 5 is a flowchart showing a flow of a search processing example by the integrated search system of the embodiment.

Next, a flow of a search processing example by the integrated search system 1 will be described (see FIG. 5). In the following search processing example, a processing example of an inquiry example "identify an individual from a facial image of a person photographed by a camera and the fingerprint of the person, and acquire the position information at the current time of the person and the probability information thereof" is illustrated.

First, the inquiry recognition unit 211 of the upper-level integrated processing device 2 combines a basic inquiry transmitted from the client terminal 12 and an auxiliary inquiry of the detection data input from the sensor 5 to recognize the inquiry data (S1). For example, in a state where the client terminal 12 has a database of fingerprint images scanned in advance, a user transmits, from the client terminal 12, a fingerprint image determined to be highly probable, a facial image captured from the camera sensor of the sensor 5, a personal identification request of the person in the facial image, and a search request for the position information at the current time of the person. The inquiry recognition unit 211 of the integrated processing device 2 recognizes the personal identification request of the person in the facial image, the search request for the position information at the current time of the person, and the fingerprint image corresponding to the basic inquiry and the facial image corresponding to the auxiliary inquiry as the inquiry data.

Then, the search request generation unit 212 of the integrated processing device 2 generates a search request in a primitive form to be output to each of the individual AI search devices 3 in response to the inquiry, and generates a search request in a primitive form to be output to the individual non-AI search device 4 (S2). At this time, if necessary, the search request generation unit 212 extracts a feature point from the necessary inquiry data, generates a search request in a primitive form to be output to each of the individual AI search devices 3 using the extracted feature point, and generates a search request in a primitive form to be output to the individual non-AI search device 4 (S2). Here, the timings of generating and outputting the search requests in a primitive form to be output to each individual AI search device 3 and individual non-AI search device 4 are not limited to simultaneous parallel, but the search requests may be generated and output in a different order in time series as necessary. Using the result of the individual reply of any individual AI search device 3 and the non-AI individual reply of any individual non-AI search device 4 or a part of the result as the data of the search request in the primitive form to be output to another individual AI search device 3 or another individual non-AI search device 4, the search request in the primitive form to be output to another individual AI search device 3 or another individual non-AI search device 4 may be generated and output.

When generating a search request in a primitive form, for example, a facial image probability extraction request is generated as a search request in a primitive form to be output to a first individual AI search device 3 that executes face recognition, a facial image probability extraction request is generated as a search request in a primitive form to be output to a second individual AI search device 3 that executes face recognition of the same type as the first individual AI search device 3, and a fingerprint probability extraction request is generated as a search request in a primitive form to be output to a third individual AI search device 3 that executes fingerprint recognition of a different type from the first and second individual AI search devices 3. Further, for example, after a personal ID described later is specified by the individual replies from the first, second, and third individual AI search devices 3, a personal position/space information extraction request including the specified personal ID is generated as a search request in a primitive form to be output to the individual non-AI search device 4 that searches for the position information at the current time of a registered person. FIG. 6 shows an example of a search request in a primitive form.

Here, the personal ID specified by the individual reply from the individual AI search device 3 may be the personal ID corresponding to the individual reply having the maximum normalized probability described later, the personal ID specified by a plurality of individual replies, or the personal ID specified by all the individual replies. When the personal IDs specified by the individual replies do not match, the subsequent search process may be stopped. If necessary, when the facial image captured from the client terminal 12 is insufficient for executing face recognition, a process of extracting a face portion from the facial image as a feature point is executed using an existing partial image extraction process or the like to generate a facial part image, and a search request in a primitive form is generated as one corresponding to the facial part image (feature point).

The integrated processing device 2 or the search request generation unit 212 outputs the generated search request in the primitive form to the corresponding individual AI search device 3 and individual non-AI search device 4 (S3). At this time, necessary auxiliary data such as a facial image for comparison and a fingerprint image for comparison is also output in the primitive form according to the search request. In this inquiry example of identifying an individual from the facial image and the fingerprint and acquiring the position information at the current time of the person, after the personal ID of the individual reply of the individual AI search device 3 is obtained, a search request in a primitive form to be output to the individual non-AI search device 4 is generated and output.

The search processing unit 311 of the lower-level individual AI search device 3 that has received the search request in the primitive form searches the individual database 323 (S4-1), acquires an individual reply corresponding to the search request in the primitive form from the individual AI database 323 and acquires the probability of the acquired individual reply (S4-2). When the search processing unit 311 executes the search processing by deep learning, the search processing unit 311 acquires the output value of the output layer indicating the prediction accuracy of the individual reply as the probability of the individual reply.

In this process, for example, the search processing unit 311 of the first individual AI search device 3 that executes face recognition in the first and second individual AI search devices 3 that search the same types of data, searches the individual AI database 323 in which data of the facial image feature amount is accumulated in response to reception of a search request (facial image probability extraction request) in the primitive form, acquires an individual reply (a personal ID including person's name) corresponding to the search request (facial image probability extraction request) in the primitive form from the individual AI database 323, and acquires the probability of the individual reply corresponding to the personal ID such as an output value of the output layer. On the other hand, the search processing unit 311 of the second individual AI search device 3 that executes face recognition searches the individual AI database 323 in which data of the facial image feature amount is accumulated in response to reception of the search request (facial image probability extraction request) in the primitive form, acquires an individual reply (a personal ID including person's name) corresponding to the search request (facial image probability extraction request) in the primitive form from the individual AI database 323, and acquires the probability of the individual reply corresponding to the personal ID such as the output value of the output layer.

Further, the search processing unit 311 of the third individual AI search device 3 that executes fingerprint recognition in the first and third individual AI search devices 3 that search different types of data searches the individual AI database 323 in which data of the fingerprint feature amount is accumulated in response to reception of a search request (fingerprint probability extraction request) in the primitive form, acquires an individual reply (a personal ID including person's name) corresponding to the search request (fingerprint probability extraction request) in the primitive form from the individual AI database 323, and acquires the probability of the individual reply corresponding to the personal ID such as the output value of the output layer.

The individual reply output unit 312 of the individual AI search device 3 outputs the acquired individual reply and the probability of the individual reply to the integrated processing device 2 in a primitive form (S4-3). For example, the individual reply output unit 312 of the first individual AI search device 3 that has executed face recognition outputs the personal ID of the individual reply and the probability of the individual reply corresponding to the personal ID in a primitive form to the integrated processing device 2, and the individual reply output unit 312 of the second individual AI search device 3 that has executed face recognition of searching the same types of data as the first individual AI search device 3 outputs the personal ID of the individual reply and the probability of the individual reply corresponding to the personal ID in a primitive form to the integrated processing device 2. Further, the individual reply output unit 312 of the third individual AI search device 3 that has executed fingerprint recognition of searching a different type of data from the first individual AI search device 3 outputs the personal ID of the individual reply and the probability of the individual reply corresponding to the personal ID to the integrated processing device 2 in a primitive form.

Further, the search processing unit 411 of the lower-level individual non-AI search device 4 that has received the search request in the primitive form searches the individual non-AI database 422 (S5-1), and acquires a non-AI individual reply corresponding to the search request in the primitive form from the individual non-AI database 422 (S5-2). In this process, for example, in response to reception of a search request in the primitive form (a personal position/space information extraction request including the personal ID specified in the individual replies from the first, second, and third individual AI search devices 3), the search processing unit 411 searches the individual non-AI database 422 in which the personal position/time information is accumulated and acquires a non-AI individual reply (a personal position/space information (the position information at the current time of the person with the personal ID)) corresponding to the personal ID in the search request in the primitive form from the individual non-AI database 422 such as a database in which the position information of the GPS data is updated from time to time.

The individual reply output unit 412 of the individual non-AI search device 4 outputs the acquired non-AI individual reply to the integrated processing device 2 in a primitive form (S5-3). In the above example, the individual reply output unit 412 of the individual non-AI search device 4 outputs the non-AI individual reply corresponding to the personal ID (the personal position/time information (the position information at the current time of the person with the personal ID)) in the primitive form to the integrated processing device 2. FIG. 7 shows an example of an individual reply in a primitive form, and FIG. 8 shows an example of a non-AI individual reply in a primitive form.

The upper-level integrated processing device 2 receives the individual reply corresponding to the search request in the primitive form and the probability of the individual reply from each of the plurality of individual AI search devices 3 and receives the non-AI individual reply corresponding to the search request in the primitive form from the individual non-AI search device 4 (S6). In this inquiry example of identifying an individual from the facial image and the fingerprint and acquiring the position information at the current time of the person, after the integrated processing device 2 receives the individual reply and the probability from the individual AI search device 3, the integrated processing device 2 receives the non-AI individual reply from the individual non-AI search device 4.

The normalization processing unit 213 of the integrated processing device 2 acquires the normalized probability obtained by normalizing the probability of the individual reply of each individual AI search device 3 on the same scale using the normalization data corresponding to the specified data that defines the probability of the individual reply of each individual AI search device 3 of the normalization data storage unit 223 with respect to the individual reply corresponding to the search request in the primitive form received from each of the plurality of individual AI search devices 3 and the probability of the individual reply and stores the normalized probability in a predetermined storage area of the storage unit 22 (S7).

In the process of acquiring the normalized probability obtained by normalizing the probability of the individual reply of each individual AI search device 3 on the same scale using the normalization data, for example, in any of the individual AI search devices 3, if the probability of the individual reply is 0.92, the maximum value of the probability is 1.0, and the minimum value of the probability is 0.0, the normalization data (maximum value of probability) is 1.0, and the normalization data (minimum value of probability) is 0.0. Thus, the normalization process of the probability of the individual reply is executed as (0.92−0.0)/(1.0−0.0), and the normalized probability is 0.92. Alternatively, for example, in another individual AI search device 1, if the probability of the individual reply is 0.92, the maximum value of the probability is 0.98, and the minimum value of the probability is 0.28, the normalization data (maximum value of probability) is 0.98, and the normalization data (minimum value of probability) is 0.28. Thus, the normalized probability of the probability of the individual reply is executed as (0.92−0.28)/(0.98−0.28) and the normalized probability is 0.914.

After that, the inquiry reply generation unit 214 of the integrated processing device 2 generates an inquiry reply corresponding to the individual reply from the individual AI search device 3 and the normalized probability thereof and corresponding to the non-AI individual reply from the individual non-AI search device 4 using the combining condition stored in the storage unit 22 (S8).

In this inquiry reply generation process, for example, a personal ID corresponding to an individual reply from the first individual AI search device 3 and the normalized probability thereof, a personal ID corresponding to an individual reply from the second individual AI search device 3 and the normalized probability thereof, a personal ID corresponding to an individual reply from the third individual AI search device 3 and the normalized probability thereof, and a non-AI individual reply (personal ID and personal position/time information (the position information at the current time (search time) of the person with the personal ID)) from the individual non-AI search device 4 are combined according to the combining condition ("equivalence of personal ID", "recording", and "acquisition of average normalized probability") to generate integrated information as an inquiry reply (person's name included in the personal ID and the comprehensive evaluation probability (average normalized probability), and the position information at the current time (search time) of the person).

As an example of the inquiry reply, the average normalized probability (comprehensive evaluation probability) of the personal ID: 0.9347 is acquired according to the combining condition "acquisition of average normalized probability" with respect to the facial image and the fingerprint of a person and the personal position/time information based on the personal ID including a person's name and the normalized probability of 0.914 corresponding to the individual reply (the personal ID including the person's name and the probability of 0.92) from the first individual AI search device 3 that executes face recognition, the personal ID including a person's name and the normalized probability of 0.933 corresponding to the individual reply (the personal ID including the person's name and the probability of 0.84) from the second individual AI search device 3 that executes face recognition, and the personal ID including a person's name and the normalized probability of 0.957 corresponding to the individual reply (the personal ID including the person's name and the probability of 0.97) from the third individual AI search device 3 that executes fingerprint recognition. Further, the non-AI individual reply from the individual non-AI search device 4 (the personal ID and the personal position/time information (the position information at the current time (search time) of the person with the personal ID)) is added according to the combining condition to generate integrated information (the person's name included in the personal ID and the comprehensive evaluation probability of 0.9347 thereof (the average normalized probability) and the position information at the current time (search time) of the person))

Then, the integrated processing device 2 or a predetermined unit of the operation control unit 21 transmits the generated inquiry reply to the client terminal 12 via the communication network 11, and replies by presenting the inquiry reply (S9).

According to the integrated search system 1 of the present embodiment, a plurality of individual AI search devices 3 trained with a large amount of data can be used in combination, and the integrated processing device 2 which is an upper-level device can generate an inquiry reply with a high probability based on a large amount of data, and can output an inquiry reply with a high probability. In particular, when the lower-level individual AI search device 3 executes a search process using deep learning, it is possible to obtain an individual reply with an extremely high probability and prediction accuracy, and based on this, the upper-level integrated processing device 2 can generate and output an inquiry reply with an extremely high probability and prediction accuracy. Further, since the integrated processing device 2 which is the upper-level device acquires the normalized probability obtained by normalizing the probability of the individual reply of the individual AI search device 3 on the same scale, the upper-level integrated processing device 2 can evaluate the probabilities of the individual replies of the individual AI search devices 3 on the same scale. Further, since the upper-level integrated processing device 2 generates and outputs the inquiry reply corresponding to the normalized probability, it is possible to output a more accurate reply.

Further, when the search process is performed using different types of individual AI search devices 3 or different types of individual AI databases 323, it is possible to generate an inquiry reply based on a multifaceted evaluation or viewpoint, and output a more accurate reply. In addition, it is possible to generate an inquiry reply that fits a more complex inquiry.

Further, when the search process is performed using the same types of individual AI search devices 3 or the same types of individual AI databases 323, it is possible to generate an inquiry reply based on an in-depth evaluation or viewpoint, and output a more accurate reply. In addition, since an inquiry reply is generated based on evaluations using a plurality of same types of individual AI databases 323, even when inaccurate data is set in a specific individual AI database 323 due to a human error or the like, or a large amount of over-learning data corresponding to an event with a low occurrence frequency is set, it is possible to suppress the deterioration of accuracy that occurs in the inquiry reply caused by these pieces of data.

Further, when the individual non-AI search device 4 is provided in the lower level, it is possible to generate inquiry replies based on various evaluations and viewpoints using a plurality of individual AI databases 323 and individual non-AI databases 422 and output a more accurate reply. Moreover, it is possible to integrate individual replies from the individual non-AI database 422 in addition to the individual replies of the individual AI search devices 3 and generate and output a multifaceted inquiry reply suitable for a more complex inquiry.

Further, due to the configuration in which the search request generation unit 212 of the integrated processing device 2 extracts the feature point corresponding to the type of the individual AI database 323 or the type of the individual AI database 323 and the type of the individual non-AI database 422 from the inquiry data using artificial intelligence and generates a search request in a primitive form corresponding to the extracted feature point, it is possible to generate a search request in a more suitable primitive form more suitable for the inquiry data such as the content of the inquiry and generate an inquiry reply based on the individual reply corresponding to the more suitable search request in the primitive form. Therefore, it is possible to further improve the accuracy of the inquiry reply and to provide a more accurate reply. In addition, it is possible to generate an accurate search request that exceeds the expectations of the search user using the reply of the feature point extraction by the processing of artificial intelligence for the search request of the secondary inquiry and enhance the accuracy of the secondary inquiry itself.

Further, due to the configuration in which the input data from the sensor 5 that detects the necessary physical quantity is included in the inquiry data, it is possible to generate an inquiry reply suitable for the detection status of the sensor 5 and output the reply based on an inquiry corresponding to the detection status of the sensor 5 such as the state of the climate, the physical condition of the search user, and the state of the physical quantity related to the search target, for example.

[Scope of Inclusion of Invention Disclosed in Present Specification]

The invention disclosed in the present specification includes, in addition to the inventions listed as inventions and embodiments, those specified by changing the partial contents thereof to other contents disclosed in the present specification to an applicable extent, those specified by adding other contents disclosed in the present specification to these contents, or those specified by deleting these partial contents to the extent that a partial action and effect can be obtained and making them into a higher concept. The invention disclosed in the present specification also includes the following modifications and additional contents.

For example, in the above embodiment, the integrated search system 1 including the upper-level integrated processing device 2, the plurality of lower-level individual AI search devices 3, and the lower-level individual non-AI search device 4 has been described. However, the integrated search system may include an appropriate configuration including an upper-level integrated processing device and a plurality of lower-level individual AI search devices. For example, the integrated search system may not include the lower-level individual non-AI search device 4 but include only the upper-level integrated processing device 2 and the plurality of lower-level individual AI search devices 3.

Further, the normalization process of the normalization processing unit in the present invention may use an appropriate configuration capable of obtaining the normalized probability by normalizing the probability of the individual reply of the individual AI search device on the same scale and is not limited to the normalization process of the normalization processing unit 213 in the embodiment.

Further, as the probability of the individual reply of the individual AI search device in the present invention, it is possible to use an appropriate probability within an applicable range other than the output value of the output layer indicating the prediction accuracy of the individual reply described above. It is possible to use an appropriate index indicating the prediction accuracy of the individual reply that can be acquired together with the acquisition of the individual reply in the individual AI search device.

Further, the generation of the search request for the individual AI search device in the present invention is not limited to a process of extracting feature points from the inquiry data in response to the inquiry and generating a search request in a primitive form to be output using the extracted feature points. The search request in the primitive form corresponding to the inquiry may be generated and output without performing the feature point extraction process.

Further, the individual reply acquired and output by the individual AI search device in the present invention and the probability thereof are preferably composed of a plurality of reply elements rather than being composed of a single reply element. For example, as shown in the example of FIG. 9(*a*), the individual AI search device may acquire, generate, and output an individual reply in a list form, for example, composed of a plurality of reply elements including a plurality of personal IDs and the corresponding plurality of probabilities, for example, by extracting a plurality of probabilities equal to or higher than a threshold stored in the storage unit of the individual AI search device or extracting a plurality of probabilities corresponding to a set number stored in the storage unit of the individual AI search device. Further, the non-AI individual reply acquired and output by the individual non-AI search device in the present invention may preferably be composed of a plurality of reply elements rather than being composed of a single reply element. For example, as shown in the example of FIG. 9(b), the individual non-AI search device may acquire, generate, and output a non-AI individual reply in a list form, for example, composed of a plurality of reply elements such as all possible reply elements corresponding to a specific personal ID. Further, when the individual reply is composed of a plurality of reply elements and the non-AI individual reply is composed of a plurality of reply elements, the integrated processing device of the present invention may preferably generate, output, and present, as an example of the inquiry reply, an inquiry reply composed of all combinations of the plurality of reply elements, a plurality of extracted inquiry replies of which the normalized probability is equal to or higher than a threshold, stored in the storage unit of the integrated processing device, or a plurality of extracted inquiry replies corresponding to a set number stored in the storage unit of the integrated processing device.

Further, the integrated processing device in the present invention may preferably generate and output an integrated reply in a primitive form as shown in the example of FIG. 10(a) as an inquiry reply to be output to the client terminal or the like, or an inquiry reply to be output to a web server interposed between the integrated processing device and the client terminal. Also in this case, as in the example of FIG. 10(b), the integrated processing device may generate and output an integrated reply in a primitive form such as a list form composed of a plurality of reply elements.

INDUSTRIAL APPLICABILITY

The present invention can be used as a system in which an upper-level device replies to an inquiry using a database search result from a lower-level device when the upper-level device replies to the inquiry.

REFERENCE SIGNS LIST

1: Integrated search system
2: Integrated processing device
21: Operation control unit
211: Inquiry recognition unit
212: Search request generation unit
213: Normalization processing unit
214: Inquiry reply generation unit
22: Storage unit
221: Integrated processing program storage unit
222: Trained model storage unit
223: Normalization data storage unit
224: Combining condition storage unit
23: Input unit
24: Output unit
25: Communication interface
3: Individual AI search device
31: Operation control unit
311: Search processing unit
312: Individual reply output unit
32: Storage unit
321: Individual AI search processing program storage unit
322: Trained model storage unit
323: Individual AI database
33: Input unit
34: Output unit
35: Communication interface
4: Individual non-AI search device
41: Operation control unit
411: Search processing unit
412: Individual reply output unit
42: Storage unit
421: Individual non-AI search processing program storage unit
422: Individual non-AI database
43: Input unit
44: Output unit
45: Communication interface
5: Sensor
11: Communication network
12: Client terminal

The invention claimed is:

1. An integrated search system comprising:
an upper-level integrated processing device that generates an inquiry reply corresponding to a basic inquiry transmitted from a client terminal connected via a communication line and transmits the inquiry reply to the client terminal; and
a plurality of lower-level individual AI search devices, wherein
input data from a sensor electrically connected to the integrated processing device separately from the client terminal so as to detect a necessary physical quantity is input to the integrated processing device as an auxiliary inquiry, and the basic inquiry and the auxiliary inquiry are combined to form the inquiry data,
the inquiry data is composed of the basic inquiry only when information indicating that sensor detection data is not to be used is input to the integrated processing device,
the integrated processing device includes:
a storage comprising a program;
one or more processors by executing the program to implement:
  an inquiry recognition unit that recognizes an inquiry corresponding to the basic inquiry;
  a search request generation unit that generates a search request in a primitive form to be output to each of the individual AI search devices in response to the inquiry;
  a normalization data storage unit that stores normalization data corresponding to specified data that defines a probability of an individual reply of each of the individual AI search devices;
  a normalization processing unit that receives an individual reply corresponding to the search request in the primitive form and a probability of the individual reply from each of the plurality of individual AI search devices and acquires a normalized probability obtained by normalizing the probability of the individual reply of each of the individual AI search devices on the same scale using the normalization data that defines the probability of the individual reply of each of the individual AI search devices stored in the normalization data storage unit such that the upper-level integrated processing device evaluates the probabilities of the individual replies from the plurality of individual AI search devices on the same scale; and
  an inquiry reply generation unit that generates an inquiry reply corresponding to each of the individual replies and the normalized probability thereof, and
the individual AI search device includes:
an individual AI database;
a storage comprising a program;
one or more processors by executing the program to implement:

a search processing unit that searches the individual AI database using artificial intelligence in response to reception of the search request in the primitive form, acquires an individual reply corresponding to the search request in the primitive form from the individual AI database, and acquires the probability of the individual reply; and an individual reply output unit that outputs the acquired individual reply and the probability of the individual reply to the integrated processing device in the primitive form, wherein the integrated search system further comprises an individual non-AI search device in the lower level, wherein the search request generation unit of the integrated processing device generates a search request in a primitive form to be output to the individual non-AI search device in response to the inquiry, the inquiry reply generation unit of the integrated processing device generates an inquiry reply corresponding to the individual reply and the normalized probability thereof and corresponding to a non-AI individual reply, and the individual non-AI search device includes:

an individual non-AI database;

a storage comprising a program;

one or more processors by executing the program to implement:

a search processing unit that searches the individual non-AI database in response to reception of the search request in the primitive form and acquires a non-AI individual reply corresponding to the search request in the primitive form from the individual non-AI database; and an individual reply output unit that outputs the acquired non-AI individual reply to the integrated processing device in the primitive form, wherein the search request generation unit of the integrated processing device extracts feature points corresponding to a type of the individual AI database and a type of the individual non-AI database from the inquiry data using artificial intelligence and generates a search request in the primitive form corresponding to the extracted feature points, wherein the feature point corresponding to the individual AI database and the feature point corresponding to the individual non-AI database are different, and the search request generation unit generates the search request to the individual non-AI search device, by using the individual reply of each of the individual AI search devices and the extracted feature point corresponding to the individual non-AI search device.

2. The integrated search system according to claim 1, wherein one individual AI database searched by at least one individual AI search device among the individual AI databases of the plurality of individual AI search devices and one individual AI database searched by another individual AI search device are different types of databases, and the one individual AI search device and the other individual AI search device search different types of data.

3. The integrated search system according to claim 2, wherein each of the search processing units of the plurality of individual AI search devices searches the individual AI database using deep learning artificial intelligence, and acquires an output value of an output layer indicating prediction accuracy of the individual reply as the probability of the individual reply.

4. The integrated search system according to claim 3, wherein a maximum value and a minimum value of a value that the probability as the individual reply output by each of the individual AI search devices can take are set as the normalization data stored in the normalization data storage unit.

5. The integrated search system according to claim 2, wherein a maximum value and a minimum value of a value that the probability as the individual reply output by each of the individual AI search devices can take are set as the normalization data stored in the normalization data storage unit.

6. The integrated search system according to claim 1, wherein one individual AI database searched by at least one individual AI search device among the individual AI databases of the plurality of individual AI search devices and one individual AI database searched by another individual AI search device are same types of databases, and the one individual AI search device and the other individual AI search device search same types of data.

7. The integrated search system according to claim 6, wherein each of the search processing units of the plurality of individual AI search devices searches the individual AI database using deep learning artificial intelligence, and acquires an output value of an output layer indicating prediction accuracy of the individual reply as the probability of the individual reply.

8. The integrated search system according to claim 7, wherein a maximum value and a minimum value of a value that the probability as the individual reply output by each of the individual AI search devices can take are set as the normalization data stored in the normalization data storage unit.

9. The integrated search system according to claim 6, wherein a maximum value and a minimum value of a value that the probability as the individual reply output by each of the individual AI search devices can take are set as the normalization data stored in the normalization data storage unit.

10. The integrated search system according to claim 1, wherein each of the search processing units of the plurality of individual AI search devices searches the individual AI database using deep learning artificial intelligence, and acquires an output value of an output layer indicating prediction accuracy of the individual reply as the probability of the individual reply.

11. The integrated search system according to claim 10, wherein a maximum value and a minimum value of a value that the probability as the individual reply output by each of the individual AI search devices can take are set as the normalization data stored in the normalization data storage unit.

12. The integrated search system according to claim 1, wherein
a maximum value and a minimum value of a value that the probability as the individual reply output by each of the individual AI search devices can take are set as the normalization data stored in the normalization data storage unit.

* * * * *